April 14, 1942.  M. J. HERZBERGER  2,279,372
PHOTOGRAPHIC OBJECTIVE
Filed Oct. 3, 1940
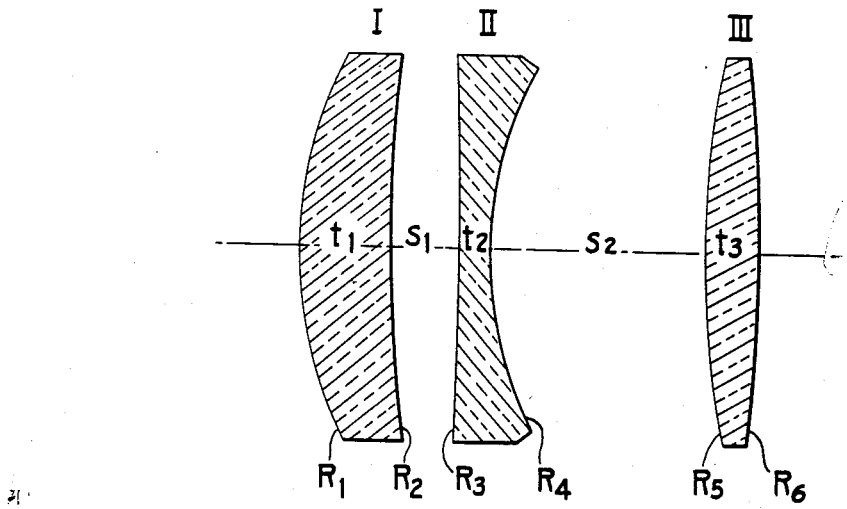
| EXAMPLE I | | COVERING POWER 21° | | |
|---|---|---|---|---|
| f 4.5 | | BACK FOCUS 96.9 | | F = 100 mm |
| LENS | $N_D$ | $\nu$ | RADII | SPACINGS |
| I | 1.6201 | 60.4 | $R_1 = +19.46$ | $t_1 = 4.4$ mm |
| | | | $R_2 = +135.85$ | $s_1 = 3.2$ " |
| II | 1.6252 | 35.6 | $R_3 = -161.48$ | $t_2 = 1.5$ " |
| | | | $R_4 = +17.99$ | $s_2 = 10.2$ " |
| III | 1.7443 | 45.8 | $R_5 = +78.10$ | $t_3 = 2.4$ " |
| | | | $R_6 = -107.97$ | |
MAXIMILIAN J. HERZBERGER
INVENTOR
BY *Newton M. Perrins*
ATTORNEY Patented Apr. 14, 1942

2,279,372

UNITED STATES PATENT OFFICE 2,279,372

PHOTOGRAPHIC OBJECTIVE

Maximilian J. Herzberger, Rochester, N. Y., assignor to Eastman Kodak Company, Rochester, N. Y., a corporation of New Jersey Application October 3, 1940, Serial No. 359,585

2 Claims. (Cl. 88—57)

This invention relates to photographic objectives and particularly to that type known as triplets.

It is an object of the invention to provide a high aperture photographic objective which can be manufactured at relatively low cost and which is highly corrected for the various aberrations including chromatic aberration, spherical aberration, astigmatism, curvature of field, distortion, coma and Petzval condition.

In the development of new lenses, many patentable improvements are in the nature of discoveries. That is, numerous possibilities are pursued each requiring several months of computations out of which one or more prove to give an improved lens. In the present case, however, the invention was arrived at in a different way. I have developed various new methods for investigating lens problems and have already published numerous papers including several articles in the Journal of the Optical Society of America relating to generalized optical laws. These appear respectively on page 295 of vol. 25; pages 35, 52, 177, 197, 205, 354 and 389 of vol. 26; pages 61, 133, 202 and 222 of vol. 27; pages 23 and 177 of vol. 28; pages 142, 392 and 395 of vol. 29; and page 307 of vol. 30 of that journal. None of these publications go into detail with respect to any particular type of lens.

However, with these general principles in mind, I investigated specifically systems made up of thin lenses having finite separations, corrected for the two color errors and certain of the mono-chromatic errors in the Seidel region. My method of attack parallels previous methods in some respects but goes much farther and results in the novel lenses described in detail below. The main difference is that prior methods of calculation decided on the glass to be used and then calculated the best lens from these glasses, whereas I determine from my theory the best range of glasses to be used for the intended purpose. Thus, I don't limit myself to a particular glass until my calculations indicate which range of glasses is best. Taking the possible choice of glass dispersions as my first limitation and computing from that the spacings and powers which the elements may have, I investigated the various ratios which affect the Seidel functions. Following along this line of reasoning, I found that an improved type of triplet is obtained when all three elements have an index of refraction greater than 1.6, with the rear element preferably greater than 1.7. With the radii of curvature of the refractive surfaces designated as $R_1$, $R_2$, etc. from the front to the rear of the lens, $R_1$ should be between $+.18F$ and $+.35F$ where $F$ is the focal length of the objective and the positive sign indicates that the surface is convex to the incident light. Preferably this radius should be about $+.2F$. $R_2$ should be positive and relatively highly curved with the value between $+F$ and $+3F$. $R_3$ should be somewhat weaker than is usual in triplets and should have a value between $-.7F$ and $-1.7F$, preferably between $-.9F$ and $-1.7F$. $R_4$ is relatively strong especially when the high aperture (f3.5 to f4.5) obtained by this invention is considered. It should be between $+.15F$ and $+.35F$, preferably less than $+.2F$.

$R_5$ should be quite strongly curved and should be a value between $+.6F$ and $+F$. $R_6$ on the other hand should be relatively weak having a value between $-.5F$ and $-1.5F$, preferably weaker than $-.75F$.

Even in the earliest design of triplets, it was apparent that different apertures required different spacings of the elements. The present invention has a corresponding limitation and is of value only when used in lenses in which the spacing between the front positive element and the negative element is between $.03F$ and $.1F$ preferably about $.04F$ and the rear spacing is between $.07F$ and $.15F$ preferably about $.1F$. The values which the radii of curvature have are important only in lenses having the spacings defined, because of the necessary interrelation of all such characteristics. It will be noted that the values taken by the radii and spacings of this lens do not conform with the usual trends in triplets and in some cases, such as in the case of $R_4$, the value is relatively small whereas high aperture lenses usually have this value relatively high.

The accompanying drawing illustrates a lens according to my invention. The following are six examples of this lens which I have found satisfactory, the first four examples being preferable as far as the quality of correction is concerned.

EXAMPLE I.—*Covering power 21°* f. 4.5    Back focus 96.9    f=100 mm.

| Lens | $N_d$ | $\nu$ | Radii | Spacings |
|---|---|---|---|---|
| I | 1.6201 | 60.4 | $R_1=+19.46$ mm. | $t_1=4.4$ mm. |
|   |        |      | $R_2=+135.85$    | $S_1=3.2$ |
| II | 1.6252 | 35.6 | $R_3=-161.48$   |  |
|    |        |      | $R_4=+17.99$    | $t_2=1.5$ |
|    |        |      |                 | $S_2=10.2$ |
| III | 1.7443 | 45.8 | $R_5=+78.10$   | $t_3=2.4$ |
|     |        |      | $R_6=-107.97$  |  |

EXAMPLE II.—*Covering power 21°* f. 4.5    Back focus 96.4    f=100 mm.

| Lens | $N_d$ | $\nu$ | Radii | Spacings |
|---|---|---|---|---|
| I | 1.6201 | 60.4 | $R_1 = +20.84$ mm. | $t_1 = 4.4$ mm. |
|   |        |      | $R_2 = +252.97$     | $S_1 = 4.2$ |
| II | 1.6252 | 35.6 | $R_3 = -103.26$    | |
|    |        |      | $R_4 = +19.19$      | $t_2 = 1.5$ |
|    |        |      |                     | $S_2 = 9.2$ |
| III | 1.7443 | 45.8 | $R_5 = +86.18$     | $t_3 = 2.4$ |
|     |        |      | $R_6 = -95.59$      | |

EXAMPLE III.—*Covering power 16°* f. 4.5    Back focus 97.3    f=100 mm.

| Lens | $N_d$ | $\mu$ | Radii | Spacings |
|---|---|---|---|---|
| I | 1.6201 | 60.4 | $R_1 = +18.92$ mm. | $t_1 = 4.4$ mm. |
|   |        |      | $R_2 = +249.76$     | $S_1 = 3.9$ |
| II | 1.6252 | 35.6 | $R_3 = -98.17$     | |
|    |        |      | $R_4 = +16.90$      | $t_2 = 1.5$ |
|    |        |      |                     | $S_2 = 10.1$ |
| III | 1.7443 | 45.8 | $R_5 = +67.37$     | $t_3 = 2.5$ |
|     |        |      | $R_6 = -133.05$     | |

EXAMPLE IV.—*Covering power 19°* f. 5.6    Back focus 97.8    f=100 mm.

| Lens | $N_d$ | $\mu$ | Radii | Spacings |
|---|---|---|---|---|
| I | 1.6201 | 60.4 | $R_1 = +19.05$ mm. | $t_1 = 4.4$ mm. |
|   |        |      | $R_2 = +273.96$     | $S_1 = 3.9$ |
| II | 1.6242 | 35.6 | $R_3 = -91.40$     | |
|    |        |      | $R_4 = +17.12$      | $t_2 = 1.5$ |
|    |        |      |                     | $S_2 = 10.1$ |
| III | 1.7443 | 45.8 | $R_5 = +69.72$     | $t_3 = 2.5$ |
|     |        |      | $R_6 = -124.75$     | |

EXAMPLE V.—*Covering power 24°* f. 3.5    Back focus 78.6    f=100 mm.

| Lens | $N_d$ | $\mu$ | Radii | Spacings |
|---|---|---|---|---|
| I | 1.6160 | 55.1 | $R_1 = +32.2$ mm. | $t_1 = 6.7$ mm. |
|   |        |      | $R_2 = +254.0$    | $S_1 = 9.4$ |
| II | 1.6490 | 33.8 | $R_3 = -74.0$    | |
|    |        |      | $R_4 = +31.3$     | $t_2 = 2.2$ |
|    |        |      |                   | $S_2 = 7.7$ |
| III | 1.6160 | 55.1 | $R_5 = +81.8$    | $t_3 = 7.1$ |
|     |        |      | $R_6 = -51.2$     | |

EXAMPLE VI.—*Covering power 26°* f. 3.5    Back focus 78.5    f=100 mm.

| Lens | $N_d$ | $\nu$ | Radii | Spacings |
|---|---|---|---|---|
| I | 1.6160 | 55.1 | $R_1 = +32.1$ mm. | $t_1 = 6.7$ mm. |
|   |        |      | $R_2 = +241.0$    | $S_1 = 9.4$ |
| II | 1.6490 | 33.8 | $R_3 = -71.4$    | |
|    |        |      | $R_4 = +31.6$     | $t_2 = 2.2$ |
|    |        |      |                   | $S_2 = 7.5$ |
| III | 1.6160 | 55.1 | $R_5 = +82.8$    | $t_3 = 7.1$ |
|     |        |      | $R_6 = -51.0$     | |

Having outlined the preferred embodiments of my invention in detail, I wish to point out that it is not limited to these examples but is of the scope of the appended claims.

What I claim and desire to secure by Letters Patent of the United States is:

1. A photographic objective comprising two positive elements air spaced about a negative element, the index of refraction for the D line being greater than 1.6 for each of the elements, $R_1$ being between $+.18F$ and $+.33F$, $R_2$ being between $+F$ and $+3F$, $R_3$ being between $-.7F$ and $-1.7F$, $R_4$ being between $+.15F$ and $+.35F$, $R_5$ being between $+.6F$ and $+F$, $R_6$ being between $-.5F$ and $-1.5F$, $S_1$ being between $.03F$ and $.1F$, $S_2$ being between $.07F$ and $.15F$, where $R_1$ to $R_6$ are respectively the radii of curvature of the refractive surfaces numbered from the front to the rear of the lens, the radius in each case being positive or negative depending on whether it is convex or concave to the incident light, where F is the focal length of the objective and where $S_1$ and $S_2$ are the front and rear axial air spaces between the elements of the objective.

2. A photographic objective comprising two positive elements air spaced about a negative element, the index of refraction for the D line being greater than 1.6 for the front positive element and for the negative element and being greater than 1.7 for the rear positive element, $R_1$ being about $.2F$, $R_2$ being between $+F$ and $+3F$, $R_3$ being between $-.9F$ and $-1.7F$, $R_4$ being between $+.15F$ and $+.2F$, $R_5$ being between $+.6F$ and $+F$, $R_6$ being between $-.75F$ and $-1.5F$, $S_1$ being about $.04F$ and $S_2$ being about $.1F$ where $R_1$ to $R_6$ are respectively the radii of curvature of the refractive surfaces numbered from the front to the rear of the lens, the radius in each case being positive or negative depending on whether it is convex or concave to the incident light, where F is the focal length of the objective and where $S_1$ and $S_2$ are the front and rear axial air spaces between the elements of the objective.

MAXIMILIAN J. HERZBERGER.